(12) United States Patent  
Ambikar

(10) Patent No.: US 8,756,087 B1  
(45) Date of Patent: Jun. 17, 2014

(54) DATA LOSS PREVENTION (DLP) SYSTEM FOR ESTIMATING MONETARY COSTS DUE TO DATA LOSS

(75) Inventor: Hemant Ambikar, Pune (IN)

(73) Assignee: Symantec Corporation, Mountain View, CA (US)

( * ) Notice: Subject to any disclaimer, the term of this patent is extended or adjusted under 35 U.S.C. 154(b) by 199 days.

(21) Appl. No.: 13/242,216

(22) Filed: Sep. 23, 2011

(51) Int. Cl.
*G06Q 10/00* (2012.01)
(52) U.S. Cl.
USPC ........................................ 705/7; 705/8; 705/9
(58) Field of Classification Search
USPC ...................................................... 705/7, 8, 9
See application file for complete search history.

(56) References Cited

U.S. PATENT DOCUMENTS

| | | | |
|---|---|---|---|
| 8,250,085 B1 * | 8/2012 | Satish | 707/758 |
| 2009/0106846 A1 * | 4/2009 | Dupray et al. | 726/26 |
| 2009/0300751 A1 * | 12/2009 | Krishnamurthy et al. | 726/13 |
| 2010/0095357 A1 * | 4/2010 | Willis et al. | 726/6 |

* cited by examiner

*Primary Examiner* — Nga B. Nguyen
(74) *Attorney, Agent, or Firm* — Lowenstein Sandler LLP

(57) ABSTRACT

A method and apparatus for estimating a monetary cost associated with an incident of a violation of a data loss prevention (DLP) policy. A DLP system may estimate the monetary cost using a data loss cost estimator. The data loss cost estimator estimates the monetary cost for one or more incidents of DLP policy violations, and reports the monetary costs associated with the one or more incidents.

19 Claims, 5 Drawing Sheets

DATA LOSS PREVENTION (DLP) SYSTEM FOR ESTIMATING MONETARY COSTS DUE TO DATA LOSS

TECHNICAL FIELD

Embodiments of the invention relate to the field of processing data, and more particularly, to improving data loss prevention (DLP) by estimating monetary costs due to data loss.

BACKGROUND OF THE INVENTION

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

Organizations take lot of efforts to install DLP components, especially on important machines where confidential data is getting generated, but they may not be able to protect each computer in the enterprise, due to reasons like large number of different platforms or operating systems (OS), machine outages, quick and dynamic provisioning of virtual machines, no clear and individual accounting for test and lab machines. DLP technologies apply configurable rules to identify objects, such as files, that contain sensitive data and should not be found outside of a particular enterprise or specific set of host computers or storage devices. Even when these technologies are deployed, it is possible for sensitive objects to 'leak'. Occasionally, leakage is deliberate and malicious, but often it is accidental too. For example, in today's global marketplace environment, a user of a computing system transmits data, knowingly or unknowingly, to a growing number of entities outside a computer network of an organization or enterprise. Previously, the number of entities were very limited, and within a very safe environment. For example, each person in an enterprise would just have a single desktop computer, and a limited number of software applications installed on the computer with predictable behavior. More recently, communications between entities may be complex and difficult for a human to monitor.

Conventional DLP systems generate reports, but these reports give the statistic of the data loss in the form of incidents generated due to violation of policies. The statistics gives all the information of the data loss, but does not include the monetary costs associated with these incidents. Currently if customer wants to know the financial impact due to data loss there is no easy way to do it. Thus, existing DLP systems fail to provide efficient solutions that can provide monetary costs associated with the incidents generated due to the violations of policies.

SUMMARY OF THE INVENTION

A method and apparatus for estimating a monetary cost associated with an incident of a violation of a DLP policy. In one embodiment, a computing system uses a data loss cost module that includes a data loss cost estimator and a data loss cost reporter. The data loss cost estimator estimates the monetary cost associated with an incident and the data loss cost reporter reports the violation of the DLP policy and the monetary cost associated with the violation. In another embodiment, a method, implemented by a computing system programmed to perform operations of the method. In one embodiment, the method estimates the monetary costs and reports the monetary cost associated with a detected incident of a violation of a DLP policy. In one embodiment, the data loss cost module is configured to allow the associated monetary costs for types of violations to be specified in the DLP policy and report the monetary cost of the loss for a particular incident. In another embodiment, the data loss cost module is configured to scan incident data of one or more incidents of violations of the DLP policy and determine the associated monetary costs of those incidents. In some embodiments, the data loss cost module may be separate from the DLP system that detects the violations.

In one embodiment, the method may receive input at the DLP system to specify a rule to estimate the monetary costs associated with one or more types of violations in the DLP policy. Based on the input, the method specifies the rule in the DLP policy. In this embodiment, the method estimates the monetary costs of the incident by calculating the monetary costs using the rule specified in the DLP policy. In a further embodiment, the method determines a type of violation from multiple types, and calculates the monetary costs based on the determined type of violation from the specified monetary costs in the DLP policy. In one embodiment, the specified monetary costs can be defined as a rule that contains a cost per unit. The cost per unit may be a specified amount of money per a specified number of lines of source code, a specified amount of money per an identified item (e.g., a credit card number, a social security number, or an account number). In another embodiment, the specified monetary costs can be defined as a rule that contains a specified amount of money per a type of user, such as sales personnel, engineer, executive, manager, software developer, employee, or the like, or may be based on a corresponding role of the user. The role may correspond to access permissions of the user within the computing environment.

In another embodiment, the monetary costs can be specified by identifying a keyword to be detected in the incident, such as a keyword that identifies an important software module in source code. The method specifies an amount of money to be associated with an incident that is detected as having this keyword.

In one embodiment, the method presents a template for defining one or more rules in the DLP policy to estimate the monetary costs associated with violations of the DLP policy. The template may be presented to a user or an administrator to allow the rules to be defined in the DLP policy. The template may have default values, may provide suggestions as to the monetary costs, and may provide monetary rates for certain types of violations, such as the estimated amount of money that would be lost if a specified number of code lines were to be lost.

In another embodiment, the method scans incident data of one or more incidents of violations of the DLP policy within a computing environment, and estimates the monetary cost associated with the one or more incidents within the computing environment. The method may report the monetary cost associated with the one or more incidents. In one embodiment, the computing environment is an enterprise network. Alternatively, other computing environments may be used. In one embodiment, the method imports the incident data from a data store before scanning the data. This may be done if, for example, the data loss cost module is separate from the DLP system that detects the incidents.

In other embodiments, the method can detect the incident of the violation of the DLP policy. For example, the method monitors, by a DLP agent of the DLP system, outbound data transfers performed by a computing system. The DLP agent detects the violation of a DLP policy in a current one of the outbound data transfers. The data loss cost module then can estimate the cost associated with the incident and report the monetary cost to the user of the computing system, another user of another system, or an administrator of an enterprise. Alternatively, the DLP agent can store the incident in a data store, and the data loss cost module can scan this incident data at a later point in time. In a further embodiment, the DLP agent classifies the current outbound data transfer into one of multiple types of violations. The data loss cost module can estimate the monetary costs associated with the incident based on a cost associated with the classified type of violation.

In another embodiment of the method, the DLP system can identify locations of protected information stored in multiple computing systems in a network, and determine, for each of the computing systems in the network, a specified amount of money that would be lost in the event of data loss of the protected information from the respective computing system. The DLP system can use this information to identify and report where to allocate sufficient or additional resources to protect the information based on the monetary cost.

In addition, a computer readable storage medium for estimating a monetary cost associated with an incident of a violation of a DLP policy is described. An exemplary computer readable storage medium provides instructions, which when executed on a processing system causes the processing system to perform a method such as the exemplary methods discussed above.

Further, systems and apparatus for estimating a monetary cost associated with an incident of a violation of a DLP policy are described. An exemplary apparatus may include a memory and a processor coupled to the memory. The processor is configured to perform various operations, such as those described above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
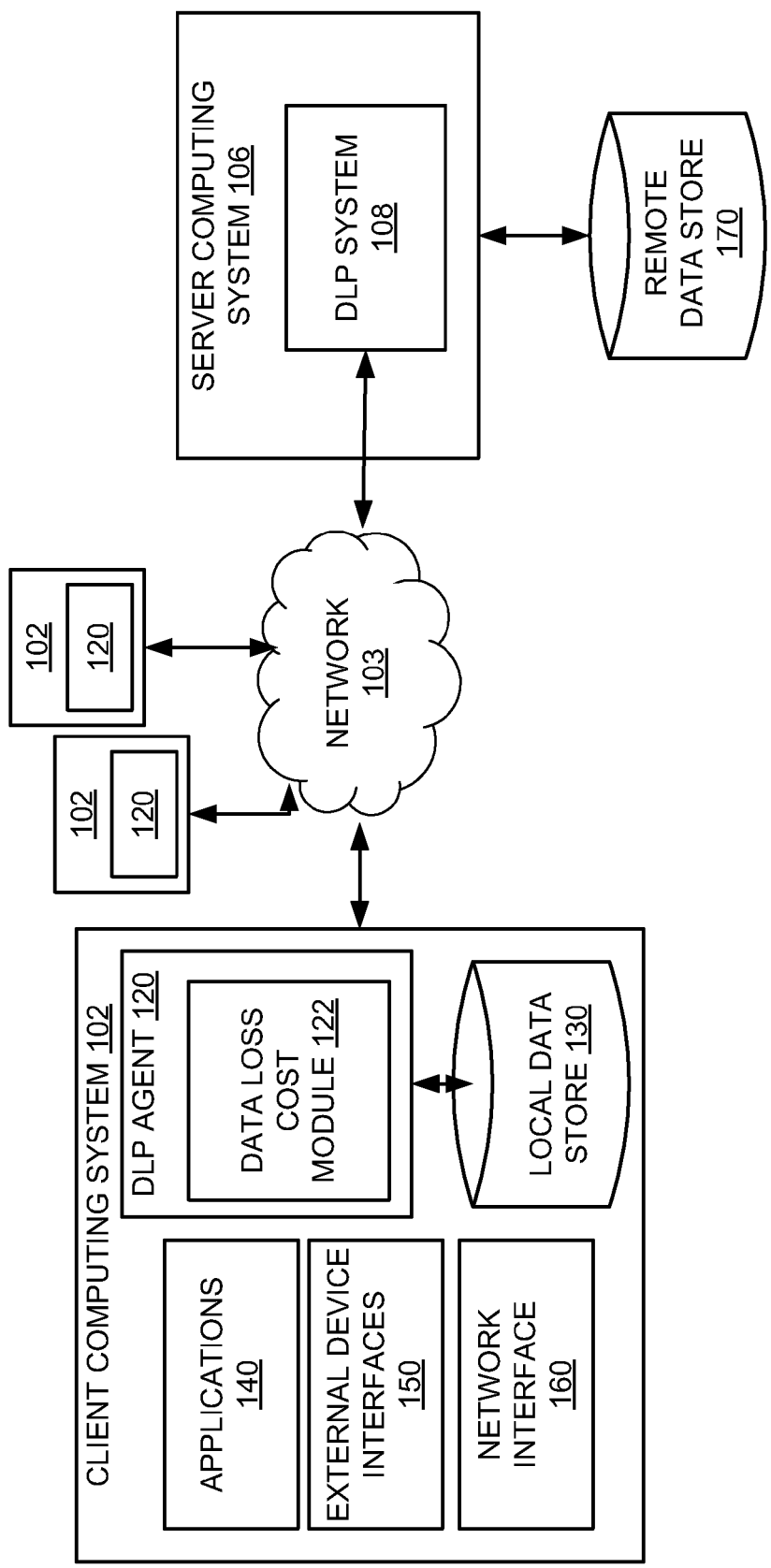
FIG. 1 is a block diagram of exemplary network architecture in which embodiments of a data loss cost estimator may operate.

A method and apparatus for estimating a monetary cost associated with an incident of a violation of a data loss prevention (DLP) policy. A DLP system may estimate the monetary cost using a data loss cost module. The data loss cost module may be an application software product that is executed by a computing system. Alternatively, the data loss cost module may be processing logic that is programmed to perform the operations described herein. The data loss cost module estimates the monetary cost for one or more incidents of DLP policy violations, and reports the monetary costs associated with the one or more incidents. Embodiments of the invention may utilize a policy-based cost estimation approach and/or a cost estimation approach based on incident data.

In the policy based cost estimation approach, an administrator can specify the cost of data unit while specifying the rule in the policy. The administrator can specify rules in the policy to be used to estimate the monetary costs of detected incidents. For example, the administrator can specify an amount of money per a specified number of lines of source code, or an amount of money per identified item, such as credit card numbers, social security numbers, account numbers, or the like. The administrator could also specify a rule that contains a specified amount of money per a type of user. For example, loss of data concerning different types of user may have different specified amounts of money. The types of user may be sales personnel, engineers, software developers, executives, managers, and other types of employees. In this approach, the administrator can define the rules that contain the cost of data loss by specifying the unit. This may allow for the creation a template of the monetary costs associated with violations of the DLP policy to be used while specifying the monetary costs for different violations of the DLP policy. The DLP system uses the specified monetary amounts in the policy to estimate the costs for a particular incident. In one embodiment, the data loss cost estimator is integrated into the DLP system so that the DLP system can estimate the monetary costs of the data loss based on the detection result. For example, the incident created in response to detecting the violation shows total cost of data loss based on the cost parameters set in the policy. The incident can be reported to an administrator after detection or may be stored in incident data. If security administrator runs a discovery routine on the incident data present in the organization, the incident data includes the monetary costs associated with the incidents. The discovery routine can give the administrator an idea about the monetary cost of protecting data in the computing environment (e.g., enterprise network). If there are incidents generated due to data in motion (i.e., users trying to send the data out of organization) then security administrator can estimate the financial loss due to data loss. The embodiments described herein can be used in existing DLP products with some or minimal changes to the products. Alternatively, new DLP products can integrate these features into the DLP product, instead of retrofitting an existing DLP product as would be appreciated by one of ordinary skill in the art having the benefit of this disclosure.

In the cost estimation based on incident data approach, the cost of data loss may not be specified in the policy. Rather, a scan can be performed on the incident data to generate a set of one or more reports indicating the cost of protecting the data in a computing environment. The computing environment may be a single computing system, or may be a network of computing systems. For example, the computing environment can be an enterprise network. Alternatively, this approach can be used in other computing environments as would be appreciated by one of ordinary skill in the art having the benefit of this disclosure. In this approach, the data loss cost module may be a separate module from the DLP system detecting the violations. For example, the DLP system can detect the violations and store the incident data in a data store. The data loss cost module may import this incident data from the data store, or may scan the data in the data store itself to estimate the monetary cost of the protected information. In one embodiment, the data loss cost module is part of the DLP system, as described above, or in a product that is separate from the DLP system. The data loss cost module may provide an interface for specifying the costs associated with the data type. Like above, the interface allows the administrator to define the specified amounts of money for different types of violations, rules for estimating the cost, etc. The data loss cost module can be used by an administrator to generate a set of one or more cost reports based on the incident data. The data loss cost module can interface with the DLP product. Alternatively, the data loss cost module that uses this approach can be integrated into existing DLP products as would be appreciated by one of ordinary skill in the art having the benefit of this disclosure.

The embodiments of the data loss cost module described herein can help an administrator or a chief information officer (CIO) to estimate the financial implication of data loss within the computing environment (e.g., of an enterprise or an organization).

In either approach, a user (e.g., an administrator of an organization or enterprise) can perform a classification of the data, and suggest the associated monetary cost of protecting the data using various definitions or cost parameters as described herein. The user can then create policies or rules to estimate the cost associated with the protected data, the cost associated with actual incidents of data loss, etc.

A simple example of estimating the cost of data protection is provided herein to illustrate how the embodiments described herein can be used. Of course, the embodiments may be used in other configurations and situations to estimate the monetary cost of the data protection in a computing environment. A financial company may run a business software application that was developed by an in-house information technology (IT) department. The application has key business rules that help the company to make business decisions faster, which contributes to higher revenues for the company. Since the software application is designed in-house the company needs to protect the source code. The company can determine the cost of the software based on the following factors: 1) Investment already done to develop the application; 2) Cost of maintaining the application; 3) Lost revenue to a competitor if the code of the application is lost to the competitor; or any combination thereof. Of course, other factors can be used based on the specifics of the data being protected, the company or organization protecting the data, etc. Using these factors, the company determines an amount of money per lines of code, keywords to identify the loss of the code of the business application, and a weighting factor for lines of code that include the keywords. An administrator can input the specified amounts in the policy via a user interface of the data loss cost module described herein. For example, the administrator can define rules that specify the amount of money per lines of code, the keywords, and the weighting factor for the keywords. For example, the monetary rate for the source code may be is defined as $100 per line of code, and the weighting factor is 10. If an incident shows that 200 lines of code were lost, the data loss cost module can estimate the monetary cost as being $200,000 (e.g., 200 lines of code×100 per line of code×the weighting factor 10). This is just one of many rules that can be defined in the policy itself or in the data loss cost rules for estimating the monetary costs associated with the incidents.

The embodiments described herein may also be used to identify the protected data available in a computing environment, and to estimate the associated monetary cost of the protected data. There are various ways the data loss cost module can help identify the protected data in a computing environment (such as within a company's enterprise network). For example, the eDAR (Endpoint Discover) tool may be used to allow a security administrator to know where all the protected data resides within the computing environment. The incidents generated by running eDAR scans and applying the cost rules, the security administrator can estimate the monetary cost of the protected data residing on various machines within the computing environment. This can help to protect the costly protected data from loss. For example, this may also be used to determine where a company should focus resources to protect the protected data based on the estimated cost reports.

In the following description, numerous details are set forth. It will be apparent, however, to one of ordinary skill in the art having the benefit of this disclosure, that embodiments of the present invention may be practiced without these specific details.

FIG. 1 is a block diagram of an exemplary network architecture 100 in which embodiments of a data loss cost module 122 may operate. The network architecture 100 may include multiple client computing systems 102 and a server computing system 106 coupled via a network 103 (e.g., public network such as the Internet or private network such as a local area network (LAN)). The client computing system 102 may include personal computers, laptops, PDAs, mobile phones, network appliances, etc. The server computing system 106 may be a network appliance, a gateway, a personal computer, etc. The client computing systems 102 and the server computing system 106 may reside on the same LAN, or on different LANs that may be coupled together via the Internet, but separated by firewalls, routers, and/or other network devices. In another embodiment, the computing systems may reside on different networks. The server computing systems 106 may host a DLP system 108. In one embodiment, the client computing systems 102 and server computing systems 106 may be part of an organization, such as a corporate enterprise. Alternatively, the server computing system 106 and the computing systems 102 may be part of different organizations.

The DLP system 108 may communicate with DLP agents 120. Although the embodiments may be used in a DLP system using DLP agents 120, the embodiments may also be used in other DLP products. Also, the embodiments described herein may be used in other applications that can be used for estimating costs associated with incidents of violations of other types of policies as would be appreciated by one of ordinary skill in the art having the benefit of this disclosure.

The DLP agents 120 include a data loss cost module 122, which is configured to estimate and report the monetary costs of incidents of violations of DLP policies. The DLP system 108 may communicate with DLP agents 120 on the client computing systems 102 to perform operations to enforce a DLP policy as described herein. The DLP agent 120 is configured to detect a violation of a DLP policy in stored data and data in motion, such as outbound data transfers. In one embodiment, the DLP agent 120 monitors outbound data transfers by the client computing system 102 (e.g., transmitting entity) to destinations, such as other computing systems over private or public networks, external devices (e.g., USB devices), network volumes, etc. When the data transfer violates the DLP policy, the DLP agent 120 creates an incident record of the violation. When a violation is detected in one of the data transfers, the data loss cost module 122 estimates the cost associated with an incident of the violation based on rules in the DLP policy as described herein. The DLP agent 120 sends the incident record, including the estimated monetary cost, to the DLP system 108. Alternatively, the DLP agent 120 can also report the estimated monetary costs to a user of the client computing system 102, an administrator on another computing system, or any combination thereof. The DLP agent 120 can also store the incident data in a data store, such as local data store 130, or remote data store 170. Incident data is data that is recorded when a violation is detected. The incident data may include any information concerning the violations, such as the type of violation, the data and time of the incident, and other pertinent information used to inform a user or an administrator of the incident for preventive and remedial purposes. In another embodiment, the data loss cost module 122 is configured to scan incident data to estimate the costs, instead of estimating the costs concurrently with the detection of the incident. The incident data may be stored in the local data store 130, the remote data store 170, or both.

The DLP system 108 is configured to receive the incident record of the violation from the DLP agent 120. In these embodiments, the DLP agent 120 creates the incident records. However, in other embodiments, any DLP product may be used to detect a violation and create an incident, and it is not limited to using DLP agents on an endpoint, as described herein. It should also be noted that other systems than DLP systems can use the data loss cost module 122 to estimate and report the monetary costs associated with the incidents.

Although only one server computing systems 106 are illustrated in FIG. 1, the DLP system 108 may be hosed on one or more machines, including one or more server computers, client computers, gateways or other computing devices. In yet another configuration, the DLP service may reside on a single server, or on different servers, coupled to other devices via a public network (e.g., the Internet) or a private network (e.g., LAN). In one embodiment, the DLP system 108 is part of an organization's system referred to herein as entity. In another embodiment, a service provider hosts the DLP system 108. The hosted service provider may also have multiple instances of the DLP system 108 on multiple networks that communicate with the service provider over a public or private network. It should be noted that various other network configurations can be used including, for example, hosted configurations, distributed configurations, centralized configurations, etc.

The depicted client computing system 102, which may operate as an endpoint machine in an enterprise network that uses the DLP system 108 to enforce one or more DLP policies, includes a DLP agent 120 that communicates with the DLP system 108. Embodiments of the DLP agent 120, which includes the data loss cost module 122, are described below with respect to FIGS. 2-3B. The client computing system 102 may include applications 140, external device interfaces 150, and network interfaces 160 that can be monitored by the DLP agent 102 as would be appreciated by one of ordinary skill in the art having the benefit of this disclosure. Alternatively, the DLP agent 102 can monitor other aspects of the client computing system 102 to monitor outbound data transfers or to scan incident data stored in the local data store 130 (or even incident data stored remotely). The client computing system 102 may also include a local data store 130, which can be one or more centralized data repositories that store the violation information, DLP policy information, data loss cost rules, and the like. The local data store 130 may represent a single or multiple data structures (databases, repositories, files, etc.) residing on one or more mass storage devices, such as magnetic or optical storage based disks, tapes or hard drives. Although illustrated as being local to the client computing system 102, the local data store 130 may be remote from the client computing system 102 and the client computing system 102 can communicate with the local data store 130 over a public or private network.

Figure 2:
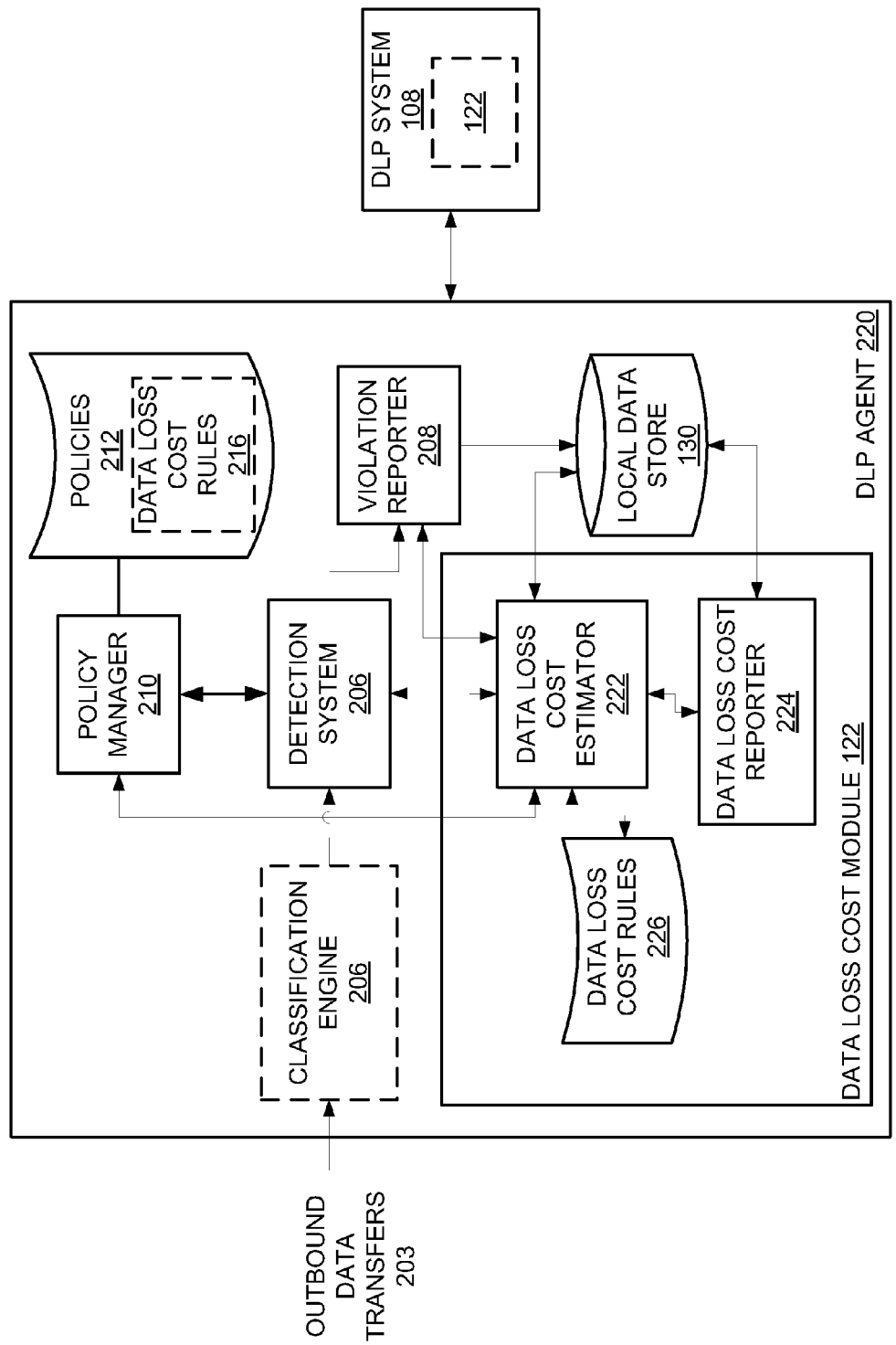
FIG. 2 is a block diagram of one embodiment of a DLP agent, including a data loss cost module and a detection system to detect violations of a DLP policy.

FIG. 2 is a block diagram of one embodiment of a DLP agent 220, including the data loss cost module 122 and a detection system 206 to detect violations of a DLP policy. The DLP agent 120 also includes a classification engine 202, a violation reporter 208, a policy manager 210, and a policy data store 212. In the depicted embodiment, the classification engine 202 is configured to classify the data of the outbound data transfers 203 as being one of multiple categories, where each category represents a specified data type. In one embodiment, the classification engine 202 is a general field classification engine that classifies the data into one of the general fields, such as, for example, Financial, Corporate, Health, Friends, Music, Videos, Banking, E-Mails, Personal Identifying Information, Confidential, and the like. In another embodiment, the classification engine 202 is an automatic classification engine (ACE), which includes multiple pre-defined classifications, as well as the ability modify the pre-defined classifications or add or remove user-defined classifications. The predefined classifications may include the following: 1) Attorney-Client Privilege: Labels; 2) Attorney-Client Privilege: Secondary Privilege; 3) Legal Documents (attachments); 4) Anti-Money Laundering—Financial Transactions and Office of Foreign Assets Control (OFAC) List; 5) Customer Complaints—Legal; 6) Customer Complaints—Service & Support; 7) Customer Complaints Responses; 8) Auto Generated Messages—Read: Not Read Out of Office Auto Reply, etc; 9) Auto Generated News, Research, and Marketing Feeds—(newsletters, research, shopping marketing); 10) Attachments—Faxes; 11) Attachments—.PSTs, .NSFs; 12) Attachments—PowerPoint; 13) Published Information (e.g. Research, Marketing); 14) Identity Theft; 15) Social Security Numbers; 16) Personally Identifiable Information; 17) Account Numbers; 18) Language—English; 19) Language—Non-English; 20) Language—French; 21) Language—Spanish; 22) Language—German; 23) Language—Chinese (Chinese character set); 24) Language—Japanese (Japanese character set); 25) Language—Korean (Korean character set); 26) Attachments—Video Files; 27) Attachments—Audio Files; 28) Attachments—Audio and Video Files; 29) Attachments—Graphic Files; 30) Internal Use Labeled; 31) Draft Documentation (Attachment); 32) Offensive Language—7 Deadly Words; 33) Offensive Language—Extended Level 1; 34) General Harassment; 35) Sexual Harassment; 36) Discrimination; 37) Religion; 38) Jokes; 39) Chain Mail; 40) Compensation Discussions; 41) Solicitations—Political; 42) Solicitations—Charities; 43) Solicitations—Private Investment; 44) Betting; 45) Gaming; 46) Contact Information Lists; 47) Resumes; 48) Financial Attachments—Firm Balance Sheets and Income Statements; 49) Financial Attachments—Invoices, Bills, Purchase Orders; 50) Financial Communication—Firm Financial Information. Of course, the classification engine 202 may be configured to monitor and classify a subset of the categories listed above for purposes of detecting violations of the DLP policy estimating monetary costs of incidents. Of course, other categories may be used as would be appreciated by one of ordinary skill in the art having the benefit of this disclosure. The categories (i.e., classifications) may be predefined and may be programmable by the user of the computing system 102 or an administrator of an entity or organization managing the system.

In another embodiment, the classification engine 202 classifies the data of the data transfers using one or more of the file extension type of the data when contained in a file, the content of the data itself, the type of data (e.g., 16-digit numbers for credit cards, 9-digit numbers for social security numbers), the placement of the data in a file, or the like. Alternatively, the classification engine 202 can use other techniques for classifying the data into multiple categories that can be separately used for estimating data loss costs apart from detecting violations as would be appreciated by one of ordinary skill in the art having the benefit of this disclosure. In other embodiments, the data loss cost module 122 can be implemented in a DLP agent 120 that does not include the classification engine.

Once the classification engine 202 has classified the data of the outbound data transfer 203, the classification engine 202 associates the data with one of the categories (e.g., Health, Financial, Corporate, or other data types), and associates the data with the destination entity specified to receive the respective outbound data transfer 203. The classification engine 202 sends this information to the detection system 206, the data loss cost module 122, or both.

In the depicted embodiment, the detection system 206 is configured to monitor outbound data transfers 203 and to scan incident data stored in a data store (e.g., local data store 130). The outbound data transfers 203 may include data in transit, such as data associated with outgoing messages or other network traffic being sent by the client computing system 102 to a destination entity. The outbound data transfers 203 may also include data being printed, copied to a remote storage device, such as USB drive, a remote disk, or the like. The outbound data transfers 203 may be any data being transferred by the client computing system 102 via a wireless or wired connection to a destination entity, such as another device or to a remote device, such as, for example, a removable storage drive. The outbound data transfers 203 may be over the network 103 or over direct connections to the client computing system 102.

The detection system 206 is configured to determine whether the data transfer 203 violations a DLP policy. The detection system 206 is used to detect the DLP policies and may perform some remedial or notification operation to help enforce the DLP policies. In the embodiments described herein, when the detection system 206 detects a violation, the data loss cost module 122 estimates the monetary cost of the incident using the data loss cost rules 216 or 226. The data loss cost rules 216 are part of the DLP policies 212 and the data loss cost rules 226 may be part of the processing logic of the data loss cost module 122. These data loss cost rules 216 or 226 may be stored locally or remotely. The data loss cost rules 216 may specify amounts of money for different types of violations, amounts of money for different types of data, a rate of cost per a specified unit (e.g., $100 per a line of source code), a keyword to be searched in the incident to identify higher value data, weighting factors, or other types of rules as described herein. The data loss cost rules 216 may be input by a user of the client computing system 102 or by an administrator, such as a security administrator of the DLP system 108. The data loss cost rules 216 may be input via a user interface presented by the data loss cost module 122, the DLP agent 120, or even an interface presented by the DLP system 108. These rules can be defined locally at the client computing system 102 or may be defined at the server computing system 104 via the DLP system 108. The DLP system 108 can also push out data loss cost rules to the client computing system 102, or the client computing system 102 can request the data loss cost rules from the DLP system 108. In one embodiment, the DLP system 108 presents a template to an administrator that allows the administrator the ability to define the data loss cost rules 216, 226.

In another embodiment, the detection system 206 can ask the user if they would like to proceed with the data transfer, alerting them to the fact that a violation has occurred. Alternatively, the DLP agent 120 can alert both before and after a violation is detected. Of course, the DLP agent 120 can also be configured to alert the user, administrator, or both. The alert may contain information about the violation, the estimated costs, or other information associated with the incident. Alternatively, the DLP agent 120 can perform other remedial or preventative actions as would be appreciated by one of ordinary skill in the art having the benefit of this disclosure.

In one embodiment, when the detection system 206 detects a violation, the violation reporter 208 creates an incident record of the violation. The detection system 206 can also notify the data loss cost module 122 that a violation has occurred. In response, the data loss cost module 122 estimates the monetary costs associated with the incident. In one embodiment, the data loss cost module 122 includes a data loss cost estimator 222 and a data loss cost reporter 224. The data loss cost estimator 222 estimates the monetary cost using the data loss cost rules 216 or 226, and the data loss cost reporter 224 adds the estimated monetary cost to the incident. The data loss cost reporter 224 can report the incident to the DLP system 108, the incident including the violation and the estimated monetary cost of the incident. Alternatively, the data loss cost reporter 224 can report the estimated costs to the violation reporter 208, and the violation reporter 208 adds the estimated monetary cost to the incident, and the violation reporter 208 reports the incident to the DLP system 108. In another embodiment, the data loss cost reporter 224 or the violation reporter 208 can store the incident data, including the estimated costs in a data store as incident data. This data can be used by an administrator to generate a set of one or more reports using the incident data and the estimated costs associated with the incident data.

The violation reporter 208 (or the data loss cost reporter 224) can send the incident records as they are generated or periodically. Similarly, the violation reporter 208 can send multiple incident records to the DLP system 108 in batches or sequentially. If a violation is detection, the violation reporter 208 may notify a system administrator (e.g., send an email or update a log file) about the policy violation incident, and may send information about the policy violation incident to the DLP service provider (e.g., DLP system 108). The information sent to the DLP service provider may identify, for example, the DLP policy being violated, the type of data being transferred, the destination entity specified to receive the data transfer, the DLP protection information of the destination entity, the estimated cost associated with the incident, or other information concerning the violation, an identifier of the user or the client computing system 102 that caused the violation, as well as other information that may be helpful in remedying or recording the incidents.

In another embodiment, the data loss cost estimator 222 can scan incident data in a data store, and estimate the costs associated with the data. The data loss cost reporter 224 then can report the estimated data as described above. The DLP system 108 may receive the incidents from the DLP agent 120 and store the incident data in the remote data store 170.

In another embodiment, DLP system 108 includes the data lost cost module 122. In one embodiment, the data loss cost module 122 estimates the monetary costs of the incidents and the incidents are received from the DLP agents 120. In another embodiment, the data loss cost module 122 scans the incident data stored in the remote data store 170 and estimates the monetary costs of the incident data.

The policy manager 302 defines DLP policies and stores them in the policy data store 212. The policy manager 302 may also be used to define the data loss cost rules 216 (or 226). The policy may require monitoring for data transfers. The policy manager 302 may create DLP policies based on input, such as from the user of the client computing system 102 or an administrator of an organization providing the client computing system 102. Alternatively, the policy manager 302 may receive DLP policies from a DLP service provider (e.g., DLP system 108) and store them in the policy data store 212.

It should be noted that the DLP system 120 may include other components for monitoring outbound data transfers 203 or scanning incident data to detect violations of the DLP policy, as well as other types of policies. Details regarding these other components have not been included so as to not obscure the description of the present embodiments.

Figure 3A:
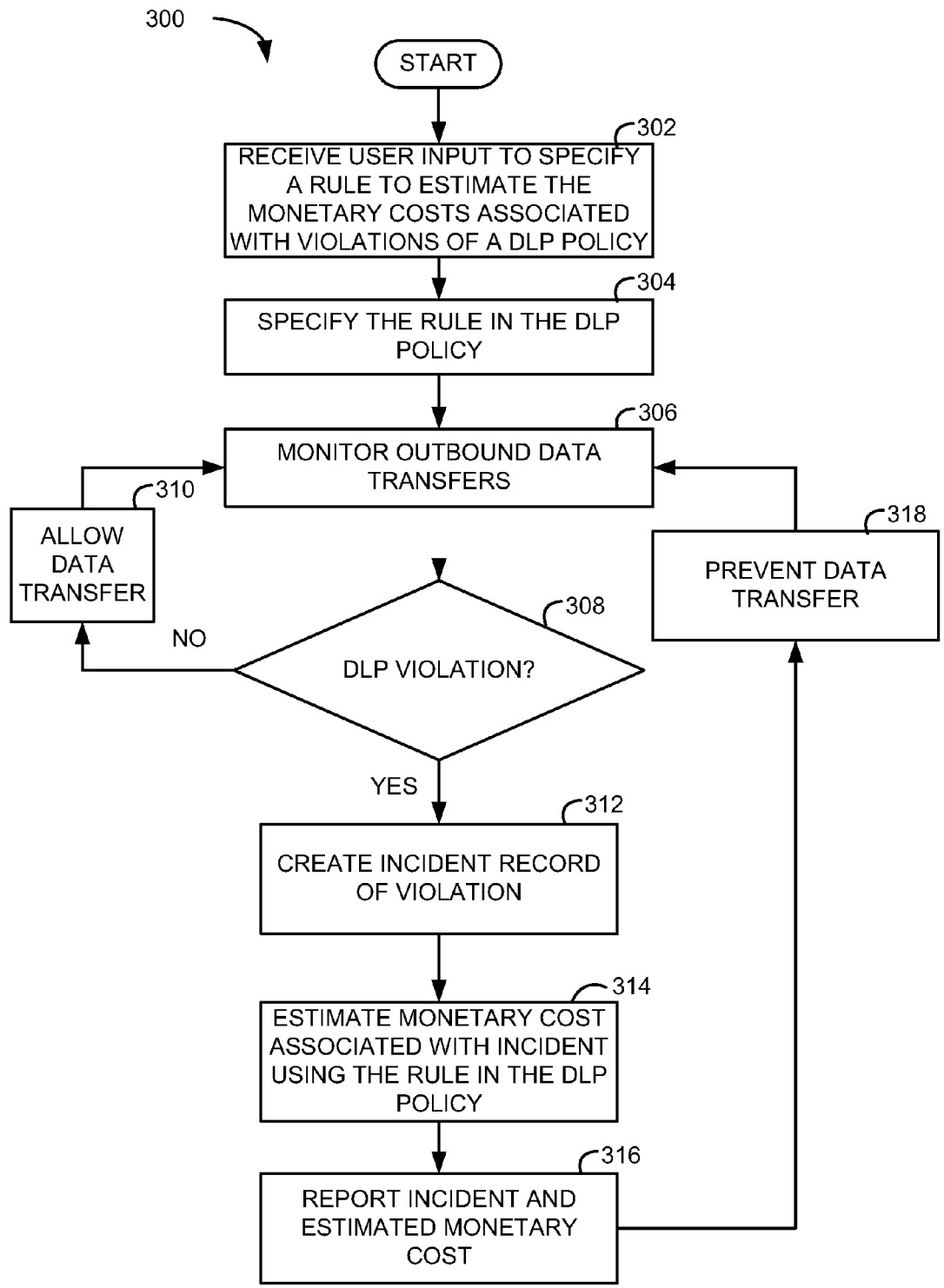
FIG. 3A is a flow diagram of one embodiment of a method of estimating monetary cost of an incident of a violation of a DLP policy when the violation is detected.

FIG. 3A is a flow diagram of one embodiment of a method 300 of estimating monetary cost of an incident of a violation of a DLP policy when the violation is detected. The method 300 is performed by processing logic that may comprise hardware (circuitry, dedicated logic, etc.), software (such as is run on a general purpose computing system or a dedicated machine), or a combination of both. In one embodiment, the client computing system 102 of FIG. 1 performs the method 300. In another embodiment, the DLP agent 120 of FIGS. 1 and 2 performs the method 300. In another embodiment, the data loss cost module 122 of FIGS. 1 and 2 performs the method 300. Alternatively, other components of the client computing system 102 can be configured to perform some or all of the method 300.

Referring to FIG. 3A, processing logic begins method 300 by receiving input specifying monetary costs associated with one or more types of violations in the DLP policy (block 302). Next, the processing logic specifies the rule in the DLP policy (block 304). Processing logic may perform blocks 302 and 304 at initialization of the DLP system, or may be updated on-demand as would be appreciated by one of ordinary skill in the art having the benefit of this disclosure. It should also be noted that there may be some time between blocks 302, 304 and block 306.

Once one or more rules are defined in the DLP policy, the processing logic monitors outbound data transfers performed by the computing system (block 306). In one embodiment, the processing logic monitors outbound network traffic to other devices over a private or public network. Alternatively, the processing logic monitors other outbound data transfers, such as data transfers to other devices via other types of connections, including transfers to a USB drive, FTP file transfers, printing activities, or the like. While monitoring in block 306, processing logic determines if a violation of the DLP policy is detected (block 308). If the processing logic does not detect a policy violation at block 308, the processing logic allows the data transfer (block 310), and returns to monitoring at block 306. If the processing logic detects a DLP violation at block 308, the processing logic may perform various operations in one of many different orders. In the depicted embodiment, the processing logic creates an incident record of the violation (block 312), then estimates the monetary costs associated with the incident using the rule in the DLP policy (block 314), reports the incident recording, including information of the violation and the estimated cost of the violation (block 316), and prevents the data transfer (block 318), returning to monitoring at block 306. In other embodiments, instead of preventing the data transfer at block 218, the processing logic may perform other operations as specified by the policy, such as notifying a system administrator, prompting the user to deny or allow the data transfer, and the like.

In one embodiment, the processing logic at block 308 determines if the current outbound data transfer includes protected information, as specified in the policy. For example, the outbound data transfer may include confidential data, or other types of protected information. In another embodiment, the processing logic at block 314 determines a type of violation for the violation from the one or more types of violations specified in the DLP policy, and calculates the monetary cost for the determined type of violation with the detected incident from the specified monetary costs in the DLP policy. In another embodiment, the rule contains a cost per unit, such as a specified amount of money per a specified number of lines of source code. The cost per unit may also be a specified amount of money per an identified item, such as a credit card number, a social security number, an account number, or the like. The cost per unit may also be a specified amount of money per a type of data, such as source code, customer lists, invoices, or the like. The cost per unit may also be a specified amount of money per a type of user. For example, different monetary costs can be associated with different types of people of an organization as would be appreciated by one of ordinary skill in the art having the benefit of this disclosure. In another embodiment, the rule contains a keyword to be detected in the incident and a specified amount of money to be associated with an incident containing the keyword. If the keyword is detected, this dollar amount can be part of the monetary cost estimate.

In another embodiment, the processing logic presents a template for defining one or more rules in the DLP policy to estimate the monetary costs associated with violations of the DLP policy. The template may be presented to a user or an administrator to allow the rules to be defined in the DLP policy. The template may have default values, may provide suggestions as to the monetary costs, and may provide monetary rates for certain types of violations, such as the estimated amount of money that would be lost if a specified number of code lines were to be lost.

Figure 3B:
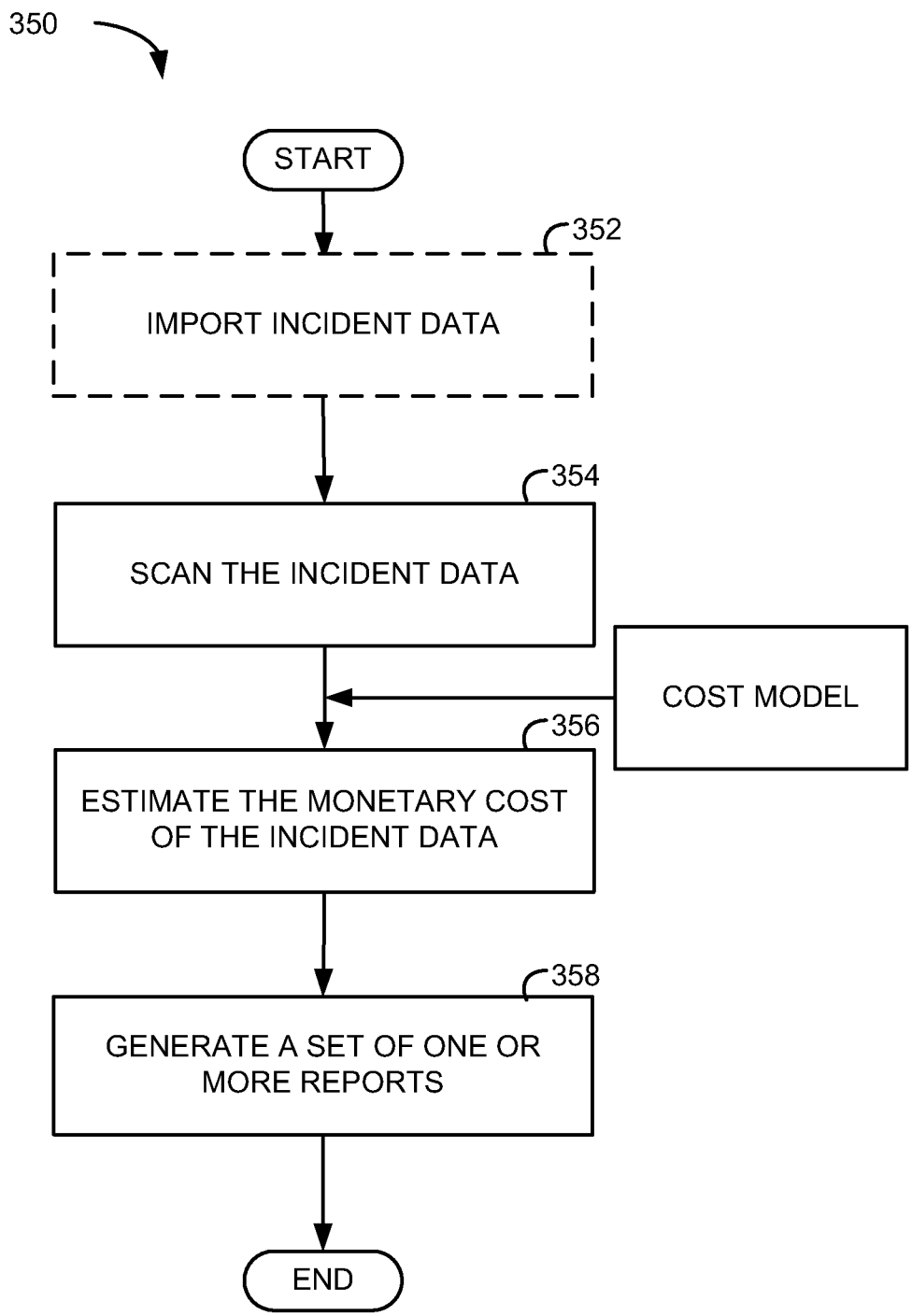
FIG. 3B is a flow diagram of one embodiment of a method of scanning incident data to estimate monetary cost of the incident data.

FIG. 3B is a flow diagram of one embodiment of a method 350 of scanning incident data to estimate monetary cost of the incident data. The method 350 is performed by processing logic that may comprise hardware (circuitry, dedicated logic, etc.), software (such as is run on a general purpose computing system or a dedicated machine), or a combination of both. In one embodiment, the client computing system 102 of FIG. 1 performs the method 350. In another embodiment, the DLP agent 120 of FIGS. 1 and 2 performs the method 350. In another embodiment, the data loss cost module 122 of FIGS. 1 and 2 performs the method 350. Alternatively, other components of the client computing system 102 can be configured to perform some or all of the method 350.

Referring to FIG. 3B, processing logic begins method 350 by importing incident data from a data source (block 352). The incident data may be imported from a data store for the DLP system 108, such as remote data store 170. In other embodiments, the processing logic can operate in the same computing system where the incident data is stored. In this case, block 352 is skipped. Next, processing logic scans the incident data (block 354). Using the cost model, the processing logic estimates the monetary cost associated with the incident data (block 356). In one embodiment, the processing logic applies one or more data loss cost rules to the scanned data to estimate the monetary costs. The incident data may represent the incident data of a computing environment, such as that of a single machine, multiple machines, a network of machines, or an enterprise. In one embodiment, the computing environment is an enterprise network. Alternatively, other computing environments may be defined. Next, processing logic generates a set of one or more reports based on the estimate monetary costs (block 358), and the method 350 ends. There are various types of reports that can be generated, such as a report to indicate locations of where protected data is stored within the computing environment and the estimated cost of that data in the event of data loss. This information can be used by a security administrator to develop policies to protect the data based on the relative costs of the data being protected. This information can also be used to estimate the financial implication of data loss within the computing environment (e.g., of an enterprise or an organization). In one embodiment, processing logic can generate a report that identifies locations of the protected data within an enterprise network, such as machines within the network. The reports can also identify the associated monetary cost for data loss of this protected information. The reports can help make informed decisions about the resources and efforts being made within the computing environment to protect the protected data.

In another embodiment, processing logic classifies the current outbound data transfer into one of multiple types of data, and uses the classification to estimate the monetary cost associated with the incident based on the data type. The processing logic may use other cost parameters to estimate the monetary costs of the incident data.

Figure 4:
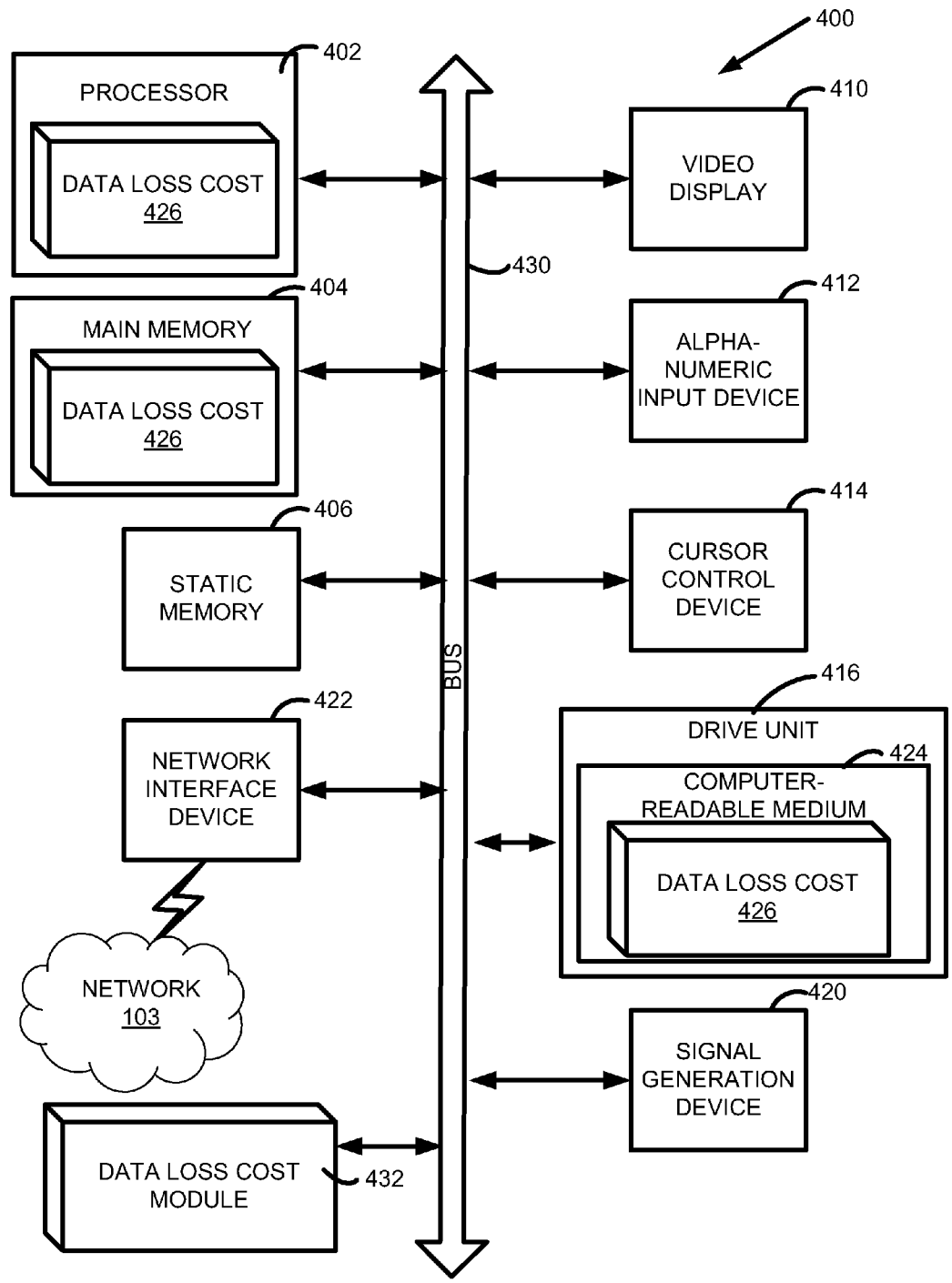
FIG. 4 illustrates a diagrammatic representation of a machine in the exemplary form of a computing system within which a set of instructions, for causing the machine to perform any one or more of the methodologies described herein, may be executed.

FIG. 4 illustrates a diagrammatic representation of a machine in the exemplary form of a computing system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as methods 300, 350 of FIGS. 3A and 3B.

The exemplary computing system 400 includes a processor 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 418, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic for data loss cost estimation 426 for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions (e.g., data loss cost estimation 426) embodying any one or more of the methodologies or functions described herein. The data loss cost estimation 426 may also reside, completely or at least partially, within the main memory 404 and/or within the processor 402 during execution thereof by the computing system 400, the main memory 404, and the processor 402 also constituting computer-readable media. The data loss cost estimation 426 may further be transmitted or received over a network 420 via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The data loss cost estimation module 432, components, and other features described herein (for example in relation to FIGS. 1, 2, 3A, and 3B) can be implemented as discrete hardware components or integrated in the functionality of hardware components such as ASICS, FPGAs, DSPs, or similar devices. The data loss cost estimation module 432 may implement operations of data loss cost estimation as described herein with respect to methods 300 and 350 of FIGS. 3A and 3B. In addition, the data loss cost estimation module 432 can be implemented as firmware or functional circuitry within hardware devices. Further, the data loss cost estimation module 432 can be implemented in any combination hardware devices and software components.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "monitoring", "creating", "generating", "sending", "intercepting," "capturing," "mapping", "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   obtaining, by a data loss cost module executing on a computing system, incident data generated in response to an incident of a violation of a data loss prevention (DLP) policy, wherein the DLP policy identifies different classifications of protected data;
   estimating, by the data loss cost module, a monetary cost associated with the incident of the violation of the DLP policy, wherein the estimating comprises applying a set of one or more data loss cost rules to the incident data, wherein the set of data loss cost rules specify cost parameters for the protected data; and
   reporting the violation of the DLP policy and the estimated monetary cost associated with the violation.

2. The method of claim 1, further comprising:
   receiving input at the data cost module to specify a rule of the set of data loss cost rules to estimate monetary costs associated with one or more types of violations of the DLP policy; and
   specifying the rule in the DLP policy, and wherein the estimating the monetary cost associated with the violation comprises calculating the monetary cost using the rule specified in the DLP policy.

3. The method of claim 1, wherein the set of data loss cost rules specifies the cost parameters based on types of violations of the DLP policy, wherein the estimating the monetary cost comprises:
   determining a type of violation for the violation from the incident data; and
   calculating the monetary cost for the determined type of violation from the cost parameters based on types of violations of the DLP policy.

4. The method of claim 1, wherein the set of data loss cost rules specifies the cost parameters as a cost per unit, wherein the cost per unit is a specified amount of money per a specified number of lines of source code.

5. The method of claim 1, wherein the set of data loss cost rules specifies the cost parameters as a cost per unit, wherein the cost per unit is a specified amount of money per an identified item, wherein the identified item is at least one of a credit card number, a social security number, or an account number.

6. The method of claim 1, wherein the set of data loss cost rules specifies the cost parameters as a specified amount of money per a type of user.

7. The method of claim 1, wherein the estimating the monetary cost further comprises:
   identifying a keyword to be detected in the incident, the keyword being defined in the set of data loss cost rules; and
   specifying an amount of money to be associated with an incident containing the keyword, the amount of money defined in the set of data loss cost rules.

8. The method of claim 2, further comprising presenting a template for defining one or more rules in the DLP policy to estimate the monetary costs associated with violations of the DLP policy.

9. The method of claim 1, wherein the obtaining the incident data comprises obtaining the incident data from a scan of a data store comprising a plurality of incidents of violations of the DLP policy within a computing environment, and wherein the method further comprises:
   estimating the monetary cost associated with the plurality of incidents of violations of the DLP policy within the computing environment; and
   reporting the monetary cost associated with the plurality of incidents.

10. The method of claim 9, wherein the computing environment is an enterprise network.

11. The method of claim 1, wherein the data loss cost module is part of a DLP system, and wherein the method further comprises detecting, by the DLP system, the incident of the violation of the DLP policy and storing the incident data in memory of the DLP system, and wherein the obtaining the incident data comprises obtaining the incident data from the memory.

12. The method of claim 11, wherein the detecting the incident comprises:
   monitoring, by a data loss prevention (DLP) agent of the DLP system, outbound data transfers performed by the computing system; and
   detecting, by the DLP agent, the violation of a DLP policy in a current one of the outbound data transfers.

13. The method of claim 12, wherein the detecting the incident comprises classifying the current one of the outbound data transfers into one of a plurality of types of data, and wherein the estimating comprises suggesting, by the DLP system, the monetary cost associated with the incident based a cost associated with the one type.

14. The method of claim 1, further comprising:
identifying locations of protected information stored in a plurality of computing systems in a network;
determining, for at least one of the plurality of computing systems, a specified amount of money associated in the event of data loss of the protected information from the at least one of the plurality of computing systems; and
reporting the specified amount of money.

15. A computing system, comprising:
a memory; and
a processor coupled with the memory to:
 obtain, by a data loss cost estimator of a data loss prevention (DLP) system executing on the processor, incident data generated in response to an incident of a violation of a DLP policy, wherein the DLP policy identifies different classifications of protected data;
 estimate, by the data loss cost estimator, a monetary cost associated with the incident of the violation of the DLP policy, wherein the data loss cost estimator is to apply a set of one or more data loss cost rules to the incident data, wherein the set of data loss cost rules specify cost parameters for the protected data; and
 report, by a data loss cost reporter of the DLP system, the violation of the DLP policy and the estimated monetary cost associated with the violation.

16. The computing system of claim 15, wherein the processor is further to:
 scan a data store comprising a plurality of incidents of violations of the DLP policy within a computing environment to obtain the incident data;
 estimate the monetary cost associated with the plurality of incidents of violations of the DLP policy within the computing environment; and
 report the monetary cost associated with the plurality of incidents.

17. A non-transitory computer readable storage medium including instructions that, when executed by a processor, cause the processor to perform operations comprising:
 obtaining, by a data loss cost module executing on a computing system, incident data generated in response to an incident of a violation of a data loss prevention (DLP) policy, wherein the DLP policy identifies different classifications of protected data;
 estimating, by the data loss cost module, a monetary cost associated with the incident of the violation of the DLP policy, wherein the estimating comprises applying a set of one or more data loss cost rules to the incident data, wherein the set of data loss cost rules specify cost parameters for the protected data; and
 reporting the violation of the DLP policy and the estimated monetary cost associated with the violation.

18. The non-transitory computer readable storage medium of claim 17, wherein the operations further comprise:
 receiving input at the data cost module to specify a rule of the set of data loss cost rules to estimate monetary costs associated with one or more types of violations of the DLP policy; and
 specifying the rule in the DLP policy, and wherein the estimating the monetary cost associated with the violation comprises calculating the monetary cost using the rule specified in the DLP policy.

19. The non-transitory computer readable storage medium of claim 17, wherein the wherein the obtaining the incident data comprises obtaining the incident data from a scan of a data store comprising a plurality of incidents of violations of the DLP policy within a computing environment, and wherein the operations further comprise:
 estimating the monetary cost associated with the plurality of incidents of violations of the DLP policy within the computing environment; and
 reporting the monetary cost associated with the plurality of incidents.

\* \* \* \* \*